United States Patent
Wei et al.

(10) Patent No.: US 11,751,165 B2
(45) Date of Patent: Sep. 5, 2023

(54) WIRELESS COMMUNICATIONS NETWORK, INFRASTRUCTURE EQUIPMENT, COMMUNICATIONS DEVICE AND METHODS

(71) Applicant: Sony Group Corporation, Tokyo (JP)

(72) Inventors: Yuxin Wei, Basingstoke (GB); Vivek Sharma, Basingstoke (GB); Hideji Wakabayashi, Basingstoke (GB); Samuel Asangbeng Atungsiri, Basingstoke (GB); Yassin Aden Awad, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 214 days.

(21) Appl. No.: 17/421,738

(22) PCT Filed: Jan. 8, 2020

(86) PCT No.: PCT/EP2020/050303
§ 371 (c)(1),
(2) Date: Jul. 9, 2021

(87) PCT Pub. No.: WO2020/148123
PCT Pub. Date: Jul. 23, 2020

(65) Prior Publication Data
US 2022/0104175 A1    Mar. 31, 2022

(30) Foreign Application Priority Data
Jan. 18, 2019 (EP) .................................. 19152668

(51) Int. Cl.
*H04W 68/02* (2009.01)
*H04B 7/185* (2006.01)
*H04W 16/28* (2009.01)

(52) U.S. Cl.
CPC ........ *H04W 68/02* (2013.01); *H04B 7/18508* (2013.01); *H04W 16/28* (2013.01)

(58) Field of Classification Search
CPC ... H04W 68/02; H04W 16/28; H04B 7/18508
(Continued)

(56) References Cited

U.S. PATENT DOCUMENTS

| 5,239,668 A * | 8/1993 | Davis ................. H04B 7/18567 455/12.1 |
| 2018/0270894 A1 * | 9/2018 | Park ...................... H04W 76/14 |

FOREIGN PATENT DOCUMENTS

| EP | 3349487 A1 | 7/2018 |
| WO | 2018/114258 A1 | 6/2018 |

OTHER PUBLICATIONS

International Search Report and Written Opinion dated Mar. 17, 2020, received for PCT Application PCT/EP2020/050303, Filed on Jan. 8, 2020, 11 pages.
(Continued)

*Primary Examiner* — Joel Ajayi
(74) *Attorney, Agent, or Firm* — XSENSUS LLP

(57) ABSTRACT

A method for operating an infrastructure equipment forming part of a radio access network part of a wireless communications network is provided. The method comprising configuring a notification area of a radio access network part by determining one or more base stations and/or one or more of non-terrestrial network parts which form part of the notification area, the base stations and/or the non-terrestrial network parts of the notification area being for use in transmitting signals to a communications device from the wireless communications network, determining, based on the notification area and on a present time, which one of the base stations and/or the non-terrestrial network parts of the notification area is presently serving the communications device, and transmitting a paging message to the serving
(Continued)

base station or serving non terrestrial network part for subsequent transmission to the communications device.

15 Claims, 5 Drawing Sheets

(58) Field of Classification Search
USPC .......................................................... 455/427
See application file for complete search history.

(56) References Cited

OTHER PUBLICATIONS

3GPP, "NR; NR and NG-RAN Overall Description; Stage 2 (Release 15)" 3GPP TS 38.300 V15.3.1, Oct. 2018, pp. 1-92.
3GPP, "Study on New Radio (NR) to Support Non Terrestrial Networks (Release 15)", 3GPP TR 38.811 V1.0.0, Jun. 2018, pp. 1-136.
3GPP, "5G System; Technical Realization of Service Based Architecture; Stage 3 (Release 16)" 3GPP TS 29.500 V16.4.0, Jun. 2020, pp. 1-78.
Thales et al., "NR-NTN: Preliminary Solutions for NR to Support Non-Terrestrial Networks", 3GPP TSG RAN Meeting #80, RP-180664, Jun. 11-14, 2018, 16 pages.
Holma et al., "LTE for UMTS OFDMA and SC-FDMA Based Radio Access", John Wiley and Sons, 2009, pp. 25-27.
NTT DOCOMO Inc., "Revised WID on New Radio Access Technology", 3GPP TSG RAN Meeting #78, RP-172834, Dec. 18-21, 2017, 11 pages.
3GPP, "Study on New Radio (NR) to Support Non Terrestrial Networks (Release 15)" 3GPP TR 38.811 V0.3.0, Dec. 2017, pp. 1-56.
3GPP, "Study on Scenarios and Requirements for Next Generation Access Technologies; (Release 14)" 3GPP TR 38.913 V14.3.0, Jun. 2017, pp. 1-39.

* cited by examiner

WIRELESS COMMUNICATIONS NETWORK, INFRASTRUCTURE EQUIPMENT, COMMUNICATIONS DEVICE AND METHODS

CROSS-REFERENCE TO RELATED APPLICATIONS

The present application is based on PCT filing PCT/EP2020/050303, filed Jan. 8, 2020, which claims priority to EP 19152668.0, filed Jan. 18, 2019, the entire contents of each are incorporated herein by reference.

BACKGROUND

Field of Disclosure

The present disclosure relates generally to infrastructure equipment of wireless communications networks communications devices, and methods of operating infrastructure equipment and communications devices, and specifically to methods of performing communications within non-terrestrial networks.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

One example area of current interest in this regard includes so-called "non-terrestrial networks", or NTN for short. 3GPP has proposed in Release 15 of the 3GPP specifications to develop technologies for providing coverage by means of one or more antennas mounted on an airborne or space-borne vehicle [1].

Non-terrestrial networks may provide service in areas that cannot be covered by terrestrial cellular networks (i.e. those where coverage is provided by means of land-based antennas), such as isolated or remote areas, on board aircraft or vessels) or may provide enhanced service in other areas. The expanded coverage that may be achieved by means of non-terrestrial networks may provide service continuity for machine-to-machine (M2M) or 'internet of things' (IoT) devices, or for passengers on board moving platforms (e.g. passenger vehicles such as aircraft, ships, high speed trains, or buses). Other benefits may arise from the use of non-terrestrial networks for providing multicast/broadcast resources for data delivery.

The use of different types of network infrastructure equipment and requirements for coverage enhancement give rise to new challenges for efficiently handling communications in wireless communications systems that need to be addressed.

SUMMARY OF THE DISCLOSURE

The present disclosure can help address or mitigate at least some of the issues discussed above.

Embodiments of the present technique can provide a method for operating an infrastructure equipment forming part of a radio access network part of a wireless communications network. The radio access network part comprises one or more base stations and one or more non-terrestrial network parts, the non-terrestrial network parts each transmitting one or more spot beams to provide a first type of wireless access interface and the base stations each forming a second type of wireless access interface, the first type of wireless access interface and the second type of wireless access interface each being for transmitting signals to and receiving signals representing data from a communications device within a coverage region of a cell of one of the base stations or a coverage region formed by one of the spot beams. The method comprising configuring a notification area of the radio access network part by determining one or more of the base stations and/or one or more of the non-terrestrial network parts which form part of the notification area, the base stations and/or the non-terrestrial network parts of the notification area being for use in transmitting signals to the communications device from the wireless communications network, determining, based on the notification area and on a present time, which one of the base stations and/or the non-terrestrial network parts of the notification area is presently serving the communications device, and transmitting a paging message to the serving base station or serving non terrestrial network part for subsequent transmission to the communications device.

Embodiments of the present technique, which further relate to communications devices and infrastructure equipment, methods of operating communications devices and infrastructure equipment, and circuitry for communications devices and infrastructure equipment, allow for the reduction in paging signalling and, in some arrangements, the reduction in RAN notification area update signalling.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
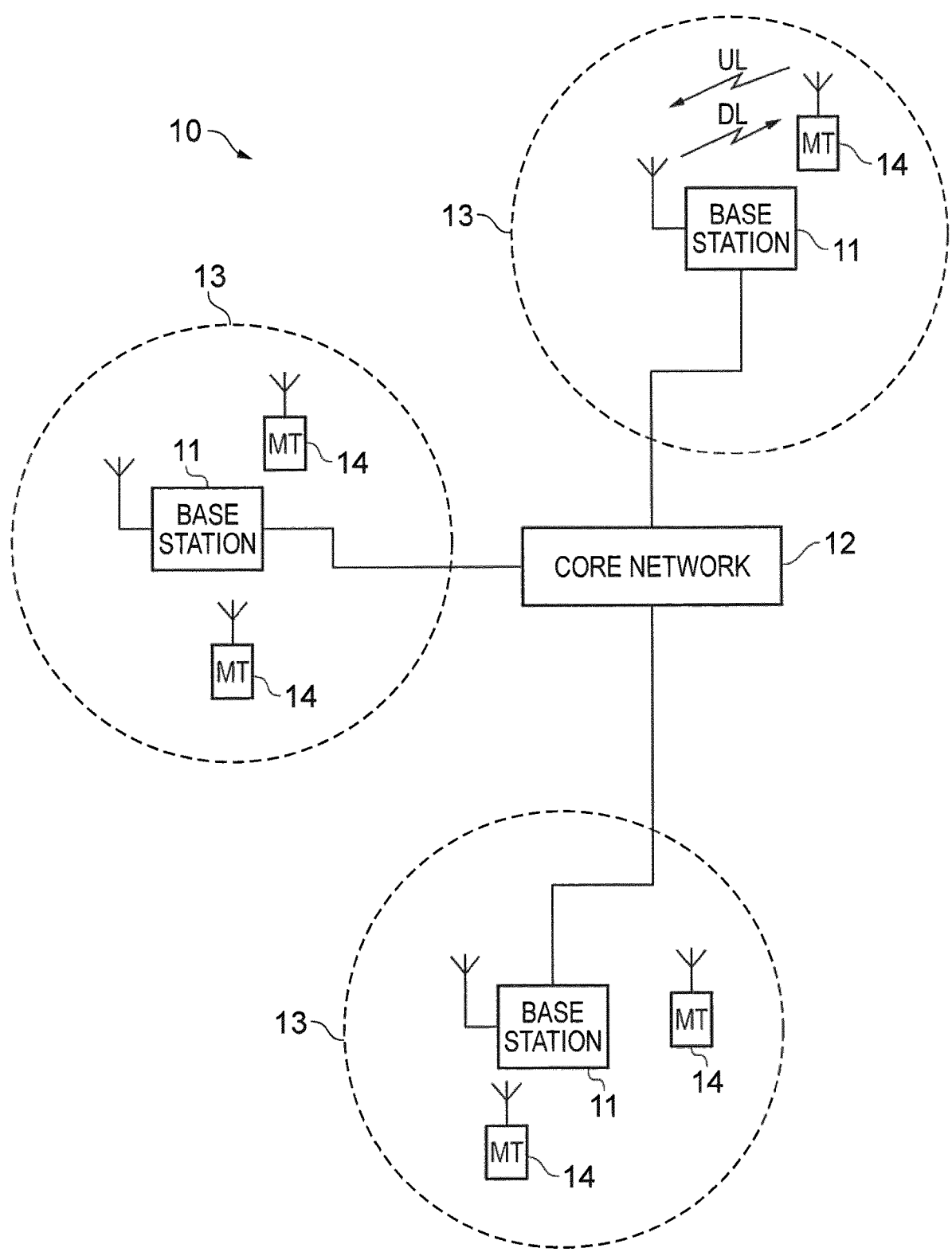
FIG. 1 schematically represents some aspects of an LTE-type wireless telecommunication system which may be configured to operate in accordance with certain embodiments of the present disclosure.

Long Term Evolution Advanced Radio Access Technology (4G) FIG. 1 provides a schematic diagram illustrating some basic functionality of a mobile telecommunications network/system 10 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [2]. It will be appreciated that operational aspects of the telecommunications (or simply, communications) networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 10 includes a plurality of base stations 11 connected to a core network 12. Each base station provides a coverage area 13 (i.e. a cell) within which data can be communicated to and from terminal devices 14. Data is transmitted from base stations 11 to terminal devices 14 within their respective coverage areas 13 via a radio downlink (DL). Data is transmitted from terminal devices 14 to the base stations 11 via a radio uplink (UL). The core network 12 routes data to and from the terminal devices 14 via the respective base stations 11 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs/eNBs/g-nodeBs/gNBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

As mentioned above, the embodiments of the present disclosure can also find application with advanced wireless communications systems such as those referred to as 5G or New Radio (NR) Access Technology. The use cases that are considered for NR include:

Enhanced Mobile Broadband (eMBB)

Massive Machine Type Communications (mMTC)

Ultra Reliable & Low Latency Communications (URLLC) [3]

eMBB services are characterised by high capacity with a requirement to support up to 20 Gb/s. The requirement for URLLC is a reliability of $1-10^{-5}$ (99.999%) for one transmission of a relatively short packet such as 32 bytes with a user plane latency of 1 ms [4].

The elements of the wireless access network shown in FIG. 1 may be equally applied to a 5G new RAT configuration, except that a change in terminology may be applied as mentioned above.

Figure 2:
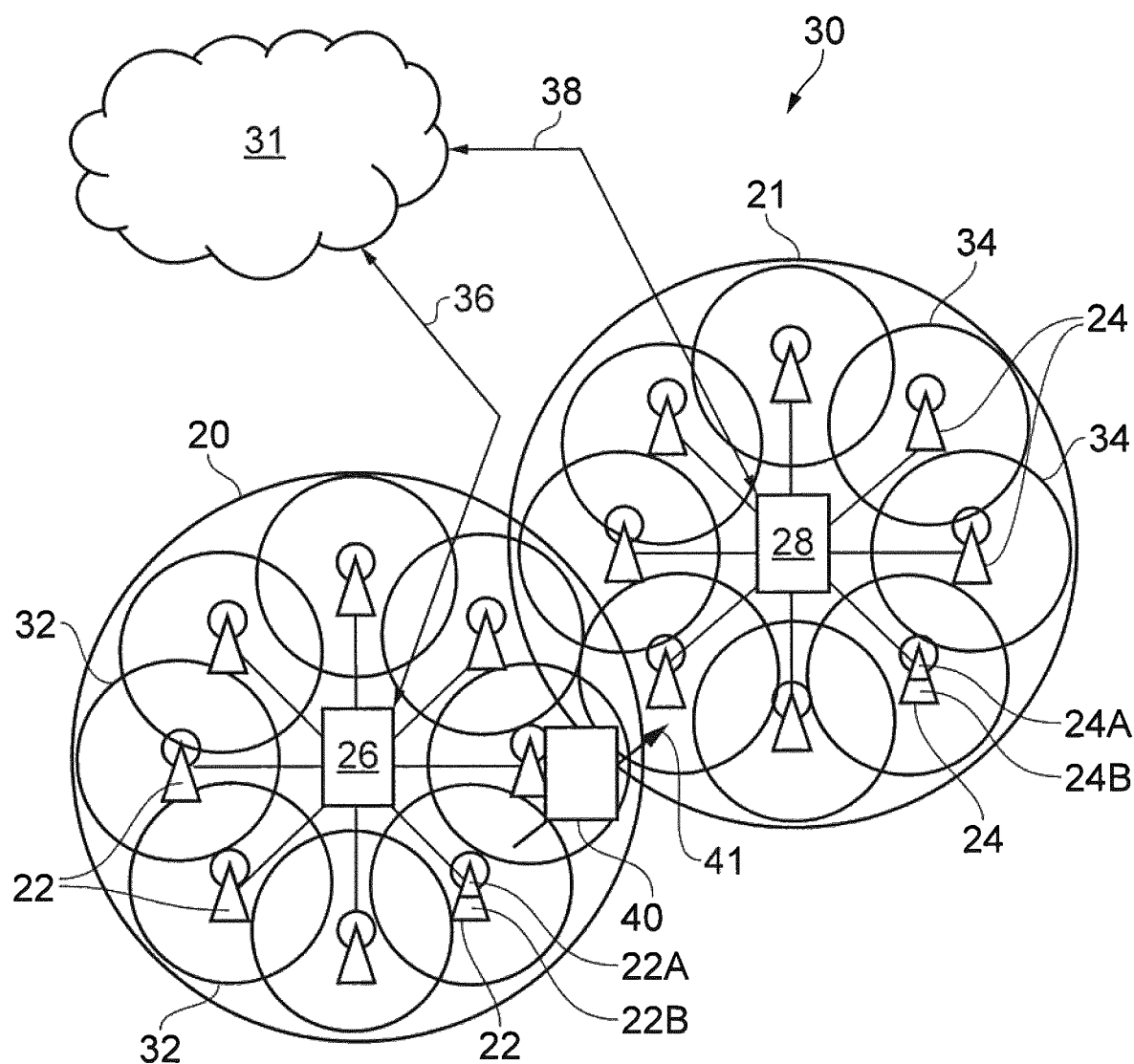
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless mobile telecommunications network/system 30 based on previously proposed approaches which may also be adapted to provide functionality in accordance with embodiments of the disclosure described herein. The new RAT network 30 represented in FIG. 2 comprises a first communication cell 20 and a second communication cell 21. Each communication cell 20, 21, comprises a controlling node (centralised unit) 26, 28 in communication with a core network component 31 over a respective wired or wireless link 36, 38. The respective controlling nodes 26, 28 are also each in communication with a plurality of distributed units (radio access nodes/ remote transmission and reception points (TRPs)) 22, 24 in their respective cells. Again, these communications may be over respective wired or wireless links. The distributed units 22, 24 are responsible for providing the radio access interface for terminal devices connected to the network. Each distributed unit 22, 24 has a coverage area (radio access footprint) 32, 34 which together define the coverage of the respective communication cells 20, 21. Each distributed unit 22, 24 includes transceiver circuitry 22a, 24a for transmission and reception of wireless signals and processor circuitry 22b, 24b configured to control the respective distributed units 22, 24.

In terms of broad top-level functionality, the core network component 31 of the new RAT telecommunications system represented in FIG. 2 may be broadly considered to correspond with the core network 12 represented in FIG. 1, and the respective controlling nodes 26, 28 and their associated distributed units/TRPs 22, 24 may be broadly considered to provide functionality corresponding to base stations of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/ TRPs.

A terminal device 40 is represented in FIG. 2 within the coverage area of the first communication cell 20. This terminal device 40 may thus exchange signalling with the first controlling node 26 in the first communication cell via one of the distributed units 22 associated with the first communication cell 20. In some cases communications for a given terminal device are routed through only one of the distributed units, but it will be appreciated in some other implementations communications associated with a given terminal device may be routed through more than one distributed unit, for example in a soft handover scenario and other scenarios.

The particular distributed unit(s) through which a terminal device is currently connected through to the associated controlling node may be referred to as active distributed units for the terminal device. Thus the active subset of distributed units for a terminal device may comprise one or more than one distributed unit (TRP). The controlling node 26 is responsible for determining which of the distributed units 22 spanning the first communication cell 20 is responsible for radio communications with the terminal device 40 at any given time (i.e. which of the distributed units are currently active distributed units for the terminal device). Typically this will be based on measurements of radio channel conditions between the terminal device 40 and respective ones of the distributed units 22. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In at least some implementations the involvement of the distributed units in routing communications from the terminal device to a controlling node (controlling unit) is transparent to the terminal device 40. That is to say, in some cases the terminal device may not be aware of which distributed unit is responsible for routing communications between the terminal device 40 and the controlling node 26 of the communication cell 20 in which the terminal device is currently operating, or even if any distributed units 22 are connected to the controlling node 26 and involved in the routing of communications at all. In such cases, as far as the terminal device is concerned, it simply transmits uplink data to the controlling node 26 and receives downlink data from the controlling node 26 and the terminal device has no awareness of the involvement of the distributed units 22, though may be aware of radio configurations transmitted by distributed units 22. However, in other embodiments, a terminal device may be aware of which distributed unit(s) are involved in its communications. Switching and scheduling of the one or more distributed units may be done at the network controlling node based on measurements by the distributed units of the terminal device uplink signal or measurements taken by the terminal device and reported to the controlling node via one or more distributed units.

In the example of FIG. 2, two communication cells 20, 21 and one terminal device 40 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2.

It will thus be appreciated the specific wireless telecommunications architecture in any given implementation is not of primary significance to the principles described herein. In this regard, certain embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 11 as shown in FIG. 1 which is adapted to provide functionality in accordance with the principles described herein, and in other examples the network infrastructure equipment may comprise a control unit/controlling node 26, 28 and/or a TRP 22, 24 of the kind shown in FIG. 2 which is adapted to provide functionality in accordance with the principles described herein.

According to some radio access technologies, including the NR radio access technologies under development by 3GPP, a cell may be formed (or, in other words, 'generated') by a plurality of directional beams. Each beam may be characterised by a variance in gain with respect to a direction from the antenna; a beam may be considered 'wide', where the gain is consistently relatively high over a broad range of directions, or 'narrow', where relatively high gain is only achieved over a narrow range of directions. Depending on the direction of the communications device with respect to the infrastructure equipment, the gain of a particular beam may be sufficiently high (and the resulting coupling loss sufficiently low) to permit communications between the communications device and the infrastructure equipment via the beam. Beams may be formed for transmitting or receiving at the infrastructure equipment using phased antenna arrays, directional antennas, a combination of both, or other known techniques. Generally, a beam is named as a Transmission Configuration Indication (TCI) state in NR.

Non-Terrestrial Networks (NTNs)

Figure 3:
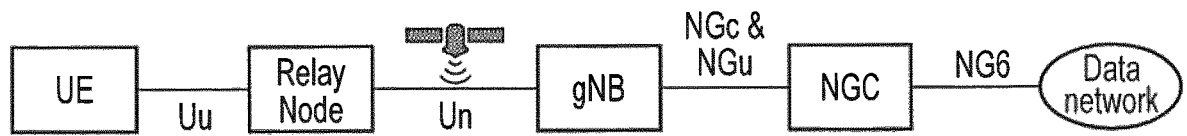
FIG. 3 is reproduced from [1], and illustrates a first example of an NTN featuring an access networking service relay nodes and based on a satellite/aerial with a bent pipe payload.
Figure 4:
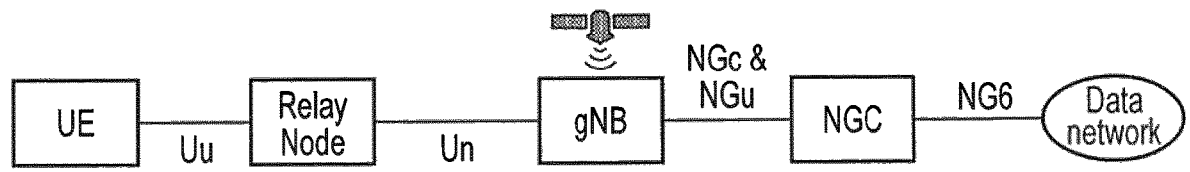
FIG. 4 is reproduced from [1], and illustrates a second example of an NTN featuring an access networking service relay nodes and based on a satellite/aerial coupled with a gNodeB.

An overview of NR-NTN can be found in [1], and much of the following wording, along with FIGS. 3 and 4, has been reproduced from that document as a way of background.

As a result of the wide service coverage capabilities and reduced vulnerability of space/airborne vehicles to physical attacks and natural disasters, Non-Terrestrial Networks are expected to:

foster the roll out of 5G service in un-served areas that cannot be covered by terrestrial 5G network (isolated/remote areas, on board aircrafts or vessels) and underserved areas (e.g. sub-urban/rural areas) to upgrade the performance of limited terrestrial networks in cost effective manner, reinforce the 5G service reliability by providing service continuity for M2M/IoT devices or for passengers on board moving platforms (e.g. passenger vehicles-aircraft, ships, high speed trains, bus) or ensuring service availability anywhere especially for critical communications, future railway/maritime/aeronautical communications, and to enable 5G network scalability by providing efficient multicast/broadcast resources for data delivery towards the network edges or even user terminal.

The benefits relate to either Non-Terrestrial networks operating alone or to integrated terrestrial and Non-Terrestrial networks. They will impact at least coverage, user bandwidth, system capacity, service reliability or service availability, energy consumption and connection density. A role for Non-Terrestrial Network components in the 5G system is expected for at least the following verticals: transport, Public Safety, Media and Entertainment, eHealth, Energy, Agriculture, Finance and Automotive.

FIG. 3 illustrates a first example of an NTN featuring an access networking service relay nodes and based on a satellite/aerial with a bent pipe payload. In this example NTN, the satellite or the aerial will relay a "satellite friendly" NR signal between the gNodeB and the relay nodes in a transparent manner.

FIG. 4 illustrates a second example of an NTN featuring an access networking service relay nodes and based on a satellite/aerial coupled with a gNodeB. In this example NTN, the satellite or aerial embarks full or part of a gNodeB to generate or receive a "satellite friendly" NR signal to/form the relay nodes. This requires sufficient on-board processing capabilities to be able to include a gNodeB or relay node functionality.

Relay node (RN) related use cases such as those shown in FIGS. 3 and 4 will play an important role in the commercial deployment of NTN; i.e. relay nodes mounted on high speed trains, relay nodes mounted in cruise ships, relay nodes at home/office and relay nodes mounted on airliners. It should be well understood by those skilled in the art that, in addition to such RNs, proposed solutions of embodiments of the present technique could be equally applied to conventional RNs/UEs.

Figure 5:
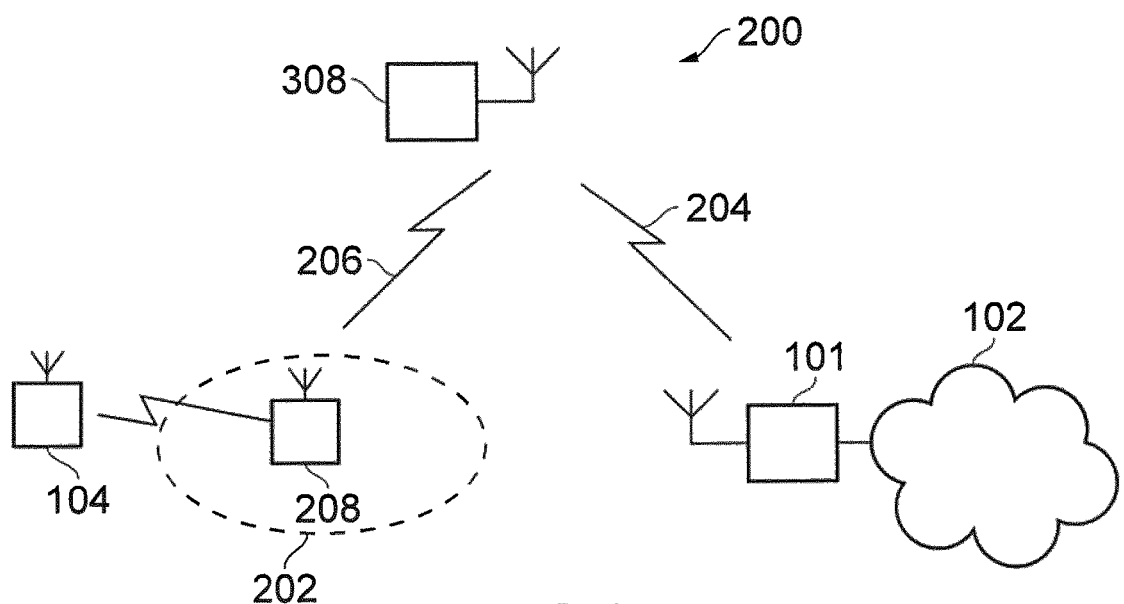
FIG. 5 schematically shows an example of a wireless communications system which may be configured to operate in accordance with embodiments of the present disclosure.

FIG. 5 schematically shows an example of a wireless communications system 200 which may be configured to operate in accordance with embodiments of the present disclosure. The wireless communications system 200 in this example is based broadly around an LTE-type or 5G-type architecture. Many aspects of the operation of the wireless communications system/network 200 are known and understood and are not described here in detail in the interest of brevity. Operational aspects of the wireless communications system 200 which are not specifically described herein may be implemented in accordance with any known techniques, for example according to the current LTE-standards or the proposed 5G standards.

The wireless communications system 200 comprises a core network part 102 (which may be a 5G core network or a NG core network) coupled to a radio network part. The radio network part comprises a base station (e.g. gNodeB/eNodeB/infrastructure equipment etc.) 101 coupled to a non-terrestrial network part 308. The non-terrestrial network part 308 may be an example of infrastructure equipment. Alternatively, or in addition, the non-terrestrial network part 308 may be mounted on a satellite vehicle or on an airborne vehicle.

The non-terrestrial network part 308 is further coupled to a communications device 208, located within a cell 202, by means of a wireless access interface provided by a wireless communications link 206. For example, the cell 202 may correspond to the coverage area of a spot beam generated by the non-terrestrial network part 308. The boundary of the cell 202 may depend on an altitude of the non-terrestrial network part 308 and a configuration of one or more antennas of the non-terrestrial network part 308 by which the non-terrestrial network part 308 transmits and receives signals on the wireless access interface.

The non-terrestrial network part 308 may be a satellite in an orbit with respect to the Earth, or may be mounted on such a satellite. For example, the satellite may be in a geo-stationary earth orbit (GEO) such that the non-terrestrial network part 308 does not move with respect to a fixed point on the Earth's surface. The geo-stationary earth orbit may be approximately 36,000 km above the Earth's equator. Alternatively, the satellite may be in a non-geostationary orbit (NGSO), so that the non-terrestrial network part 308 moves with respect to a fixed point on the Earth's surface. The non-terrestrial network part 308 may be an airborne vehicle such as an aircraft, or may be mounted on such a vehicle. The airborne vehicle (and hence the non-terrestrial network part 308) may be stationary with respect to the surface of the Earth or may move with respect to the surface of the Earth.

In FIG. 5, the base station 101 is shown as ground-based, and coupled to the non-terrestrial network part 308 by means of a wireless communications link 204. The non-terrestrial network part 308 receives signals representing downlink data transmitted by the base station 101 on the wireless communications link 204 and, based on the received signals, transmits signals representing the downlink data via the wireless communications link 206 providing the wireless access interface for the communications device 206. Similarly, the non-terrestrial network part 308 receives signals representing uplink data transmitted by the communications device 206 via the wireless access interface comprising the wireless communications link 206 and transmits signals representing the uplink data to the base station 101 on the wireless communications link 204. The wireless communications links 204, 206 may operate at a same frequency, or may operate at different frequencies.

The extent to which the non-terrestrial network part 308 processes the received signals may depend upon a processing capability of the non-terrestrial network part 308. For example, the non-terrestrial network part 308 may receive signals representing the downlink data on the wireless communication link 204, amplify them and (if needed) re-modulate onto an appropriate carrier frequency for onwards transmission on the wireless access interface provided by the wireless communications link 206. Alternatively, the non-terrestrial network part 308 may be configured to decode the signals representing the downlink data received on the wireless communication link 204 into un-encoded downlink data, re-encode the downlink data and modulate the encoded downlink data onto the appropriate carrier frequency for onwards transmission on the wireless access interface provided by the wireless communications link 206.

The non-terrestrial network part 308 may be configured to perform some of the functionality conventionally carried out by the base station 101. In particular, latency-sensitive functionality (such as acknowledging a receipt of the uplink data, or responding to a Random Access (RACH) request, which would be well known to those skilled in the art) may be performed by the non-terrestrial network part 308 instead of by the base station 101.

The base station 101 may be co-located with the non-terrestrial network part 308; for example, both may be mounted on the same satellite vehicle or airborne vehicle, and there may be a physical (e.g. wired, or fibre optic) connection on board the satellite vehicle or airborne vehicle, providing the coupling between the base station 101 and the non-terrestrial network part 308. In such co-located arrangements, a wireless communications link between the base station 101 and a ground station (not shown) may provide connectivity between the base station 101 and the core network part 102.

The communications device 208 shown in FIG. 5 may be configured to act as a relay node. That is, it may provide connectivity to one or more terminal devices such as the terminal device 104. When acting as a relay node, the communications device 208 transmits and receives data to and from the terminal device 104, and relays it, via the non-terrestrial network part 308 to the base station 101. The communications device 208, acting as a relay node, may thus provide connectivity to the core network part 102 for terminal devices which are within a transmission range of the communications device 208.

It will be apparent to those skilled in the art that many scenarios can be envisaged in which the combination of the communications device 208 and the non-terrestrial network part 308 can provide enhanced service to end users. For example, the communications device 208 may be mounted on a passenger vehicle such as a bus or train which travels through rural areas where coverage by terrestrial base stations may be limited. Terminal devices on the vehicle may obtain service via the communications device 208 acting as a relay, which is coupled to the non-terrestrial network part 308.

There is a need to ensure that connectivity for the communications device 208 with the base station 101 can be maintained, in light of the movement of the communications device 208, the movement of the non-terrestrial network part 308 (relative to the Earth's surface), or both. According to conventional cellular communications techniques, a decision to change a serving cell of the communications device 208 may be based on measurements of one or more characteristics of a radio frequency communications channel, such as signal strength measurements or signal quality measurements. In a terrestrial communications network, such measurements may effectively provide an indication that the communications device 208 is at, or approaching, an edge of a coverage region of a cell, since, for example, path loss may broadly correlate to a distance from a base station. However, such conventional measurement-based algorithms may be unsuitable for cells generated by means of the transmission of beams from a non-terrestrial network part, such as the cell 202 generated by the non-terrestrial network part 308. In particular, path loss may be primarily dependent on an altitude of the non-terrestrial network part 308 and may vary only to a very limited extent (if at all) at the surface of the Earth, within the coverage region of the cell 202.

A further disadvantage of conventional techniques may be the relatively high rate at which cell changes occur for the communications device 208 obtaining service from one or more non-terrestrial network parts. For example, where the non-terrestrial network part 308 is mounted on a satellite in a low-earth orbit (LEO), the non-terrestrial network part 308 may complete an orbit of the Earth in around 90 minutes; the coverage of a cell generated by the non-terrestrial network part 308 will move very rapidly, with respect to a fixed observation point on the surface of the earth. Similarly, it may be expected that the communications device 208 may be mounted on an airborne vehicle itself, having a ground speed of several hundreds of kilometres per hour.

Unlike camping on a terrestrial cell, a RN/UE camps on a spot beam of a satellite which, in the case of (non-geostationary earth orbit (NGSEO) satellites, does move. This means that a RN/UE will camp on different spot beams (cells) and/or different satellites over time, regardless of whether or not the RN/UE itself is moving. As a result, it is foreseen that handover will likely be carried out much more frequently than in conventional terrestrial-based wireless networks, especially for LEO NTNs. For GEO NTNs, the spot beam coverage does not move, but handover will still be needed if the RN/UE is moving between the coverage of different spot beams. Handover procedure should be optimised in order to reduce the signalling overhead.

RRC Inactive State and RAN Notification Area

The following text and description of RRC_INACTIVE (also termed herein the RRC Inactive state or simply inactive state) and the RAN notification area (RNA) is loosely adapted from [5], and is provided here so as to give a background on RRC_INACTIVE. It should be appreciated that those skilled in the art would have a complete understanding on RRC_INACTIVE, including transition processes between this state and RRC_CONNECTED (also termed herein the RRC Connected state or simply connected state), and the RAN notification area update (RNA), as described in [5], among other documents.

RRC_INACTIVE is a state where a UE remains in the connection management connected (CM-CONNECTED) state and can move within an area configured by the Next-Gen Radio Access Network (NG-RAN)—this area being the RNA—without notifying NG-RAN. In RRC_INACTIVE, the last serving gNodeB node keeps the UE context and the UE-associated NG connection with the serving access and mobility management function (AMF) and user plane function (UPF).

If the last serving gNodeB receives downlink data from the UPF or downlink UE-associated signalling from the AMF (except the UE Context Release Command message) while the UE is in RRC_INACTIVE, it pages in the cells corresponding to the RNA and may send XnAP RAN Paging to neighbour gNodeB(s) if the RNA includes cells of neighbour gNodeB(s).

Upon receiving the UE Context Release Command message while the UE is in RRC_INACTIVE, the last serving gNodeB may page in the cells corresponding to the RNA and may send Xn Application Protocol (XnAP) RAN Paging to neighbour gNodeB(s) if the RNA includes cells of neighbour gNodeB(s), in order to release the UE explicitly.

The AMF provides to the NG-RAN node the RRC Inactive Assistance Information to assist the NG-RAN node's decision as to whether the UE can be controlled to transition to RRC_INACTIVE. The RRC Inactive Assistance Information includes the registration area configured for the UE, the UE specific discontinuous reception (DRX) configuration, Periodic Registration Update timer, an indication if the UE is configured with Mobile Initiated Connection Only (MICO) mode by the AMF, and UE Identity Index value. The UE registration area is taken into account by the NG-RAN node when configuring the RNA. The UE specific DRX configuration and UE Identity Index value are used by the NG-RAN node for RAN paging. The Periodic Registration Update timer is taken into account by the NG-RAN node to configure Periodic RNA Update timer.

At transition to RRC_INACTIVE the NG-RAN node may configure the UE with a periodic RNA Update timer value. If the UE accesses a gNodeB other than the last serving gNodeB, the receiving gNodeB triggers the XnAP Retrieve UE Context procedure to get the UE context from the last serving gNodeB and may also trigger a Data Forwarding procedure including tunnel information for potential recovery of data from the last serving gNodeB. Upon successful UE context retrieval, the receiving gNodeB performs the slice-aware admission control in case of receiving slice information and becomes the serving gNodeB and it further triggers the NG application protocol (NGAP) Path Switch Request and RRC procedures properly. After the path switch procedure, the serving gNodeB triggers release of the UE context at the last serving gNodeB by means of the XnAP UE Context Release procedure.

In case the UE is not reachable at the last serving gNodeB, the gNodeB fails AMF initiated UE-associated class 1 procedures if any, and triggers the NAS Non Delivery Indication procedure to report the non-delivery of any NAS PDU received from the AMF for the UE.

If the UE accesses a gNodeB other than the last serving gNodeB and the receiving gNodeB does not find a valid UE Context, the receiving gNodeB can perform establishment of a new RRC connection instead of resumption of the previous RRC connection.

A UE in the RRC_INACTIVE state is required to initiate RNA update procedure when it moves out of the configured RNA. When receiving RNA update request from the UE, the receiving gNodeB triggers the XnAP Retrieve UE Context procedure to get the UE context from the last serving gNodeB and may decide to send the UE back to RRC_INACTIVE state, move the UE into RRC_CONNECTED state, or send the UE to RRC_IDLE.

A UE in RRC_INACTIVE performs cell reselection. A UE in the RRC_INACTIVE state can be configured by the last serving NG-RAN node with an RNA, where:
- the RNA can cover a single or multiple cells, and is contained within the CN registration area; (in [5] it is stated that Xn connectivity should be available within the RNA); and
- a RAN-based notification area update (RNAU) is periodically sent by the UE and is also sent when the cell reselection procedure of the UE selects a cell that does not belong to the configured RNA.

There are several different alternatives on how the RNA can be configured:
- List of cells:
  - UE is provided an explicit list of cells (one or more) that constitute the RNA;
- List of RAN areas:
  - A UE is provided (at least one) RAN area ID, where a RAN area is a subset of a CN Tracking Area or equal to a CN Tracking Area. A RAN area is specified by one RAN area ID, which consists of a TAI and optionally a RAN area Code; and
  - A cell broadcasts one or more RAN area IDs in the system information.

NG-RAN may provide different RNA definitions to different UEs but not mix different definitions to the same UE at the same time. A UE as described in the context of [5] supports all RNA configuration options listed above.

In summary, as described in [5], the RRC_INACTIVE state can be characterised by:
- Broadcast of system information;
- Cell re-selection mobility;
- Paging is initiated by NG-RAN (RAN paging);
- RAN-based notification area (RNA) is managed by NG-RAN;
- DRX for RAN paging configured by NG-RAN;
- 5GC—NG-RAN connection (both C/U-planes) is established for UE;
- The UE AS context is stored in NG-RAN and the UE; and
- NG-RAN knows the RNA which the UE belongs to.

The RNA configured for a UE may cover either a single cell, or multiple cells, and may be smaller than the core network area. An RNA update (RNAU) is transmitted by the UE to the network periodically, and also when the UE's cell reselection procedure selects a cell outside of the configured RNA.

NTN UEs in RRC_INACTIVE State

From the current RRC_INACTIVE state description, we can summarise that:
- The RNA is composed of one or several cells. When the UE moves out of coverage of the last serving base station, the last serving base station will send a paging message to all of the cells in the RNA if there downlink data or signalling data for the UE;
- The cell that serves a UE will move with time in LEO based NTN with moving beams, which means that paging messages will be distributed within RAN even when UE doesn't move at all;
- UE context retrieval procedure will be triggered only after receiving the UE resume request; and
- A UE in the RRC_INACTIVE state will be configured with a periodic RNA update timer.

The benefits of UEs in the RRC_INACTIVE state (i.e. power saving and control signalling reduction) can be applied to NTN UEs as well. The motivation can be seen for NTN UEs (i.e. a drone carrying a UE) to support RRC_INACTIVE as well. If the direct data transmission is to be supported in the inactive state, the benefits could be even greater. Therefore user data can be received in RRC_INACTIVE state, or carried for example in a paging message, or conveyed in a paging like procedure, or received after being paged while still in RRC_INACTIVE state, or received after being paged and moving to RRC_CONNECTED state.

For the scenario in which the flight path plan is known in advance, for example, an auto piloted, package delivery drone, and the speed/direction of the NTN UE is able to be estimated, there is room to further enhance its performance in RRC_INACTIVE state.

The inactive state is important in NTN as:

Considering the long propagation delay in NTN, the signalling overhead saving on state transition from RRC_INACTIVE to RRC_CONNECTED compared with the state transition from RRC_IDLE to RRC_CONNECTED will become even more significant; and Direct data transmission in inactive state will further accelerate data transmission.

As both the UE location and cells/spot beam to cover a certain UE will be known in advance, there is room to further enhance the performance for NTN UEs in the RRC_INACTIVE state.

Enhancements in RRC Inactive State in NTN

Figure 6:
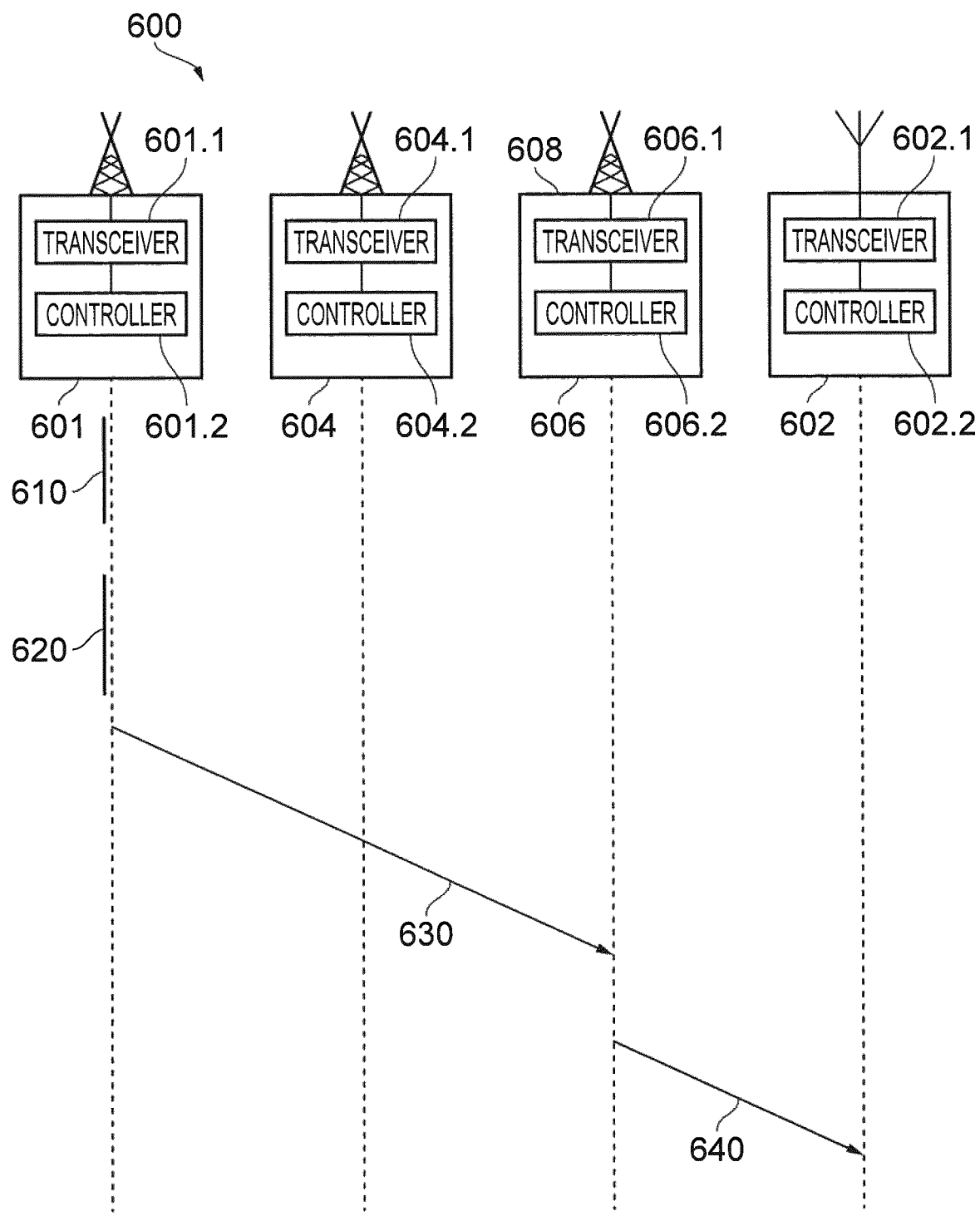
FIG. 6 shows a part schematic, part message flow diagram representation of a wireless communications network comprising an infrastructure equipment and a communications device in accordance with embodiments of the present technique.

FIG. 6 shows a part schematic, part message flow diagram representation of a wireless communications system 600 comprising an infrastructure equipment 601 forming part of a radio access network (RAN) part of a wireless communications network, the radio access network part comprising one or more base stations 604 and one or more non-terrestrial network parts 606, the non-terrestrial network parts 606 each transmitting one or more spot beams to provide a first type of wireless access interface and the base stations 604 each forming a second type of wireless access interface, the first type of wireless access interface and the second type of wireless access interface each being for transmitting signals to and receiving signals representing data from a communications device 602 within a coverage region of a cell of one of the base stations 604 or a coverage region formed by one of the spot beams, wherein the communications device 602 is operating in an RRC inactive state.

The base stations 604 and non-terrestrial network parts 606 (both of which may be an example of an infrastructure equipment) and both the infrastructure equipment 601 and the communications device 602 each comprise a transceiver (or transceiver circuitry) 604.1, 606.1, 601.1, 602.1, and a controller (or controller circuitry) 604.2, 606.2, 601.2, 602.2. Each of the controllers 604.2, 606.2, 601.2, 602.2 may be, for example, a microprocessor, a CPU, or a dedicated chipset, etc.

The controller circuitry 601.2 and the transceiver circuitry 601.1 of the infrastructure equipment 601 are configured in combination to configure 610 a notification area of the radio access network by determining one or more of the base stations 604 and/or one or more of the non-terrestrial network parts 606 which form part of the notification area, the base stations 604 and/or the non-terrestrial network parts 606 of the notification area being for use in transmitting signals to the communications device 602 from the wireless communications network, to determine 620, based on the notification area and on a present time, which one 608 of the base stations 604 and/or the non-terrestrial network parts 606 of the notification area is presently serving the communications device 602, and to transmit 630 a paging message to the serving base station 608 or serving non terrestrial network part 608 for subsequent transmission 640 to the communications device 602.

Essentially therefore, RAN paging messages will be sent only to the cell 608 which is probably serving the UE 602, and thus paging signalling can be saved when compared to paging all of the cells in the RNA. The base stations 604 and/or the non-terrestrial network parts 606 of the notification area are determined (by the RAN part of the wireless communications network 600) based on one or more of a pre-planned journey to be made by the communications device 602 (e.g. flight path, where the UE is an NTN UE such as an unmanned aerial vehicle (UAV) or is a UE situated on an aeroplane), location information received from the communications device 602 indicating a geographical area in which the communications device 602 is located, and ephemeris information of the non-terrestrial network parts 606 and/or the communications device 602. Equally, the likely serving cell 608 is also determined by the (RAN part of the of the wireless communications network 600) according to, for example, the last known UE 602 location and one of the non-terrestrial part's 606 (i.e. satellite's) trajectory estimation.

In at least some embodiments, the infrastructure equipment 601 is one of the base stations 604 and/or the non terrestrial network parts 606 of the notification area which was most recently serving the communications device 602 before the serving base station 608 or the serving non-terrestrial network part 608.

In some arrangements of embodiments of the present technique, the RNA is configured according to the candidate satellite/beam/base station information, so no RNA notification update is done if UE moves solely within that area. If, however, the UE moves outside of the configured RNA, a RNA notification update together with a location report will be sent from the UE to the network. In other words, the RAN (i.e. infrastructure equipment) is configured to receive, from the communications device, location information indicating a geographic area in which the communications device is located and a notification area update indicating that the communications device has moved outside the coverage of the base stations and/or the non-terrestrial network parts of the notification area.

In some arrangements of embodiments of the present technique, when the UE moves into the RRC_INACTIVE state, the network will configure the RNA as a cell list, indicating which cells or spot beams are going to cover the UE at what times according to, for example, the UE's location, UE's flight path and satellite's ephemeris information. In other words, the infrastructure equipment is configured to transmit an indication of the notification area to the communications device. The cell list can be sent to the UE via dedicated signalling or can be broadcast in the system information in a format of RAN area ID. Furthermore, the infrastructure equipment may be configured to transmit an indication of the notification area to each of the base stations and/or the non-terrestrial network parts of the notification area.

In some arrangements of embodiments of the present technique, if there is downlink data for the UE, according to at least the satellite's ephemeris information, the last serving base station can estimate in which cell UE may reside. Then instead of paging all the cells in RNA, a paging message to that estimated serving cell will be sent. Likewise, when data is to be sent to the UE, the core network will only send data to the corresponding serving base station/gNodeB according to the list of satellites/base stations in the notification area for the communications device (in accordance with time, and location/position information and the UE/satellites). In other words, the paging message indicates that there is downlink data to be transmitted to the communications device, and the wireless communications network is configured to transmit the downlink data to the serving base station or serving non terrestrial network part for subsequent transmission to the communications device.

In some arrangements of embodiments of the present technique, as a further enhancement, the corresponding UE context information will be transferred in advance from the last serving base station to candidate serving base stations, according to when the inactive UE will be served by a candidate gNodeB. Then in the resume procedure from RRC_INACTIVE to RRC_CONNECTED, there is no need to wait for the UE context information to be transferred from last serving base station to latest serving base station, hence accelerating the state transition (or data transmission) procedure. In other words, the RAN (i.e. infrastructure equipment) is configured to control each of the base stations and/or the non-terrestrial network parts of the notification area, when acting as the serving base station or serving non terrestrial network part, to transmit context information associated with the communications device to a next one of the base stations and/or the non-terrestrial network parts of the notification area which will be serving the communications device subsequently to the serving base station or serving non terrestrial network part.

In some arrangements of embodiments of the present technique, if the mobility speed of the UE is fast and/or moving direction is changeable (e.g. it is situated on an aeroplane or is a UAV UE), it may be difficult for the network to estimate the location in which the UE may reside. In some arrangements of embodiments of the present technique, as a further enhancement, the applicability of the above method (relating to the estimation of the present serving cell) involves a validity timer. Based on the UE's/non-terrestrial network part's (i.e. satellite's) mobility speed, or the difficulty of estimation, the network may release the context and paging of all of the cells. Alternatively, if the network frequently receives the RAN notification area update (RNAU), the UE changes the applicability of above method. As a further enhancement, the UE may send the predicted location to the network at certain times (e.g. 30 minutes later, 1 hour later, 3 hour later, etc.) if the route is planned in advance when the UE enters the RRC_INACTIVE from RRC_CONNECTED. After receiving the paging for the UE, the latest serving base station will page the UE according to the conventional procedure.

In [5], the periodic RAN update timer T380 is defined as below:
PeriodicRNAU–TimerValue::=ENUMERATED {min5, min10, min20, min30, min60, min120, min360, min720}

In some arrangements of embodiments of the present technique, for the UEs in NTN, once it goes to RRC_INACTIVE state, the periodic timer can be disabled or set to a very large value (or, indeed, set to an infinite value) as there is no need for the UE to periodically notify the change of its latest serving base station. With this special setting, the corresponding update signalling can be saved significantly. In other words, the RAN (i.e. infrastructure equipment) is configured to disable a periodic notification area update timer for the communications device, the periodic notification area update timer being for use by the communications device to change between the base stations and/or the non-terrestrial network parts of the notification area as a serving base station or serving non terrestrial part depending on the position of the communications device in the notification area. From the other side, if UE is without positioning capability, it is better to define a periodic timer less than 5 mins, e.g. several seconds, to notify the network where the UE is now. As described above, the UE will only need to send update signalling if the new serving cell is not in the RNA cell list. The UE will send its updated location report afterwards to help the network to position its current location, and the UE may receive an updated RNA configuration afterwards.

In accordance with embodiments of the present technique, the coverage region formed by at least one of the spot beams may vary over time in accordance with a motion of the non-terrestrial network part transmitting the at least one spot beam with respect to the surface of the Earth. Alternatively, a trajectory of at least one of the non-terrestrial network parts may be such that the coverage region formed by each of the spot beams transmitted by the at least one non-terrestrial network part is substantially constant over a time period. The non-terrestrial network parts may each comprise one of a satellite, an airborne vehicle or an airborne platform. Each of the spot beams may be a different one of a set of Transmission Configuration Indication, TCI, states.

Embodiments of the present technique may comprise, from the viewpoint of the operation of an infrastructure equipment forming part of a radio access network part of the wireless communications network, receiving, from a second infrastructure equipment of the radio access network part, an indication of a notification area of the radio access network part comprising the infrastructure equipment, the notification area further comprising one or more of the base stations and/or one or more of the non-terrestrial network parts, the base stations and/or the non-terrestrial network parts of the notification area being for use in transmitting signals to the communications device from the wireless communications network, determining, based on the notification area and on a present time, that the infrastructure equipment is presently serving the communications device, receiving a paging message from the second infrastructure equipment, and transmitting the paging message to the communications device. The infrastructure equipment here may be one of the base stations (e.g. a gNodeB) or may be one of the non-terrestrial network parts (e.g. a satellite), and may be presently serving the communications device. The second infrastructure equipment here may be one of the base stations and/or the non-terrestrial network parts of the notification area which was most recently serving the communications device before the infrastructure equipment.

Embodiments of the present technique may comprise, from the viewpoint of the operation of a communications device operating in the wireless communications network, receiving, from a serving one of the base stations or non-terrestrial network parts, an indication of a notification area comprising the serving base station or serving non-terrestrial network part, the notification area further comprising one or more of the base stations and/or one or more of the non-terrestrial network parts, the base stations and/or the non-terrestrial network parts of the notification area being for use in transmitting signals to the communications device from the wireless communications network, and transmitting, either to one of the base stations and/or the non-terrestrial network parts of the radio access network part or to a core network part of the wireless communications network via one of the base stations and/or the non-terrestrial network parts of the radio access network part, location information indicating a geographic area in which the communications device is located and a notification area update indicating that the communications device has moved outside the coverage of the base stations and/or the non-terrestrial network parts of the notification area. The communications device may be configured to receive a paging message from serving base station or serving non-terrestrial network part, the paging message indicates that there is downlink data to be transmitted to the communications device. If this is the case, the communications device may be configured to transition from the RRC inactive state to an RRC connected state in order to receive the downlink data, and to receive the downlink data from the core network part via serving base station or serving non terrestrial network. The communications device may be a non-terrestrial communications device (such as a UAV UE or may be located on an aeroplane for example) or may be a conventional ground-based communications device.

Flow Chart Representation

Figure 7:
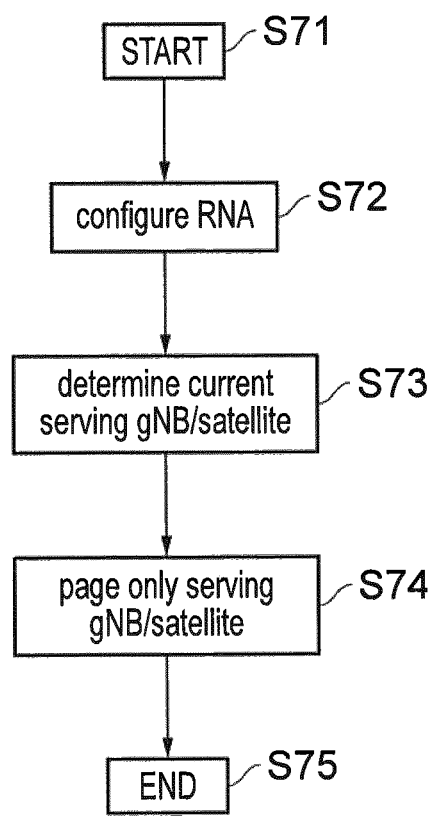
FIG. 7 is a flow diagram representation of a method of operating an infrastructure equipment according to embodiments of the present technique.

FIG. 7 shows a flow diagram illustrating a method for operating an infrastructure equipment forming part of a radio access network part of a wireless communications network. The radio access network part comprises one or more base stations and one or more non-terrestrial network parts, the non-terrestrial network parts each transmitting one or more spot beams to provide a first type of wireless access interface and the base stations each forming a second type of wireless access interface, the first type of wireless access interface and the second type of wireless access interface each being for transmitting signals to and receiving signals representing data from a communications device within a coverage region of a cell of one of the base stations or a coverage region formed by one of the spot beams, wherein the communications device is operating in an RRC inactive state.

The method begins in step S71. The method comprises, in step S72, configuring a notification area of the radio access network part by determining one or more of the base stations and/or one or more of the non-terrestrial network parts which form part of the notification area, the base stations and/or the non-terrestrial network parts of the notification area being for use in transmitting signals to the communications device from the wireless communications network. In step S73, the process comprises determining, based on the notification area and on a present time, which one of the base stations and/or the non-terrestrial network parts of the notification area is presently serving the communications device. The method then advances to step S74, which comprises transmitting a paging message to (only) the serving base station or serving non terrestrial network part for subsequent transmission to the communications device. The process ends in step S75.

Those skilled in the art would appreciate that the method shown by FIG. 7 may be adapted in accordance with embodiments of the present technique. For example, other intermediate steps may be included in the method, or the steps may be performed in any logical order.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present disclosure.

The following numbered paragraphs provide further example aspects and features of the present technique:

Paragraph 1. A method for operating an infrastructure equipment forming part of a radio access network part of a wireless communications network, the radio access network part comprising one or more base stations and one or more non-terrestrial network parts, the non-terrestrial network parts each transmitting one or more spot beams to provide a first type of wireless access interface and the base stations each forming a second type of wireless access interface, the first type of wireless access interface and the second type of wireless access interface each being for transmitting signals to and receiving signals representing data from a communications device within a coverage region of a cell of one of the base stations or a coverage region formed by one of the spot beams, wherein the communications device is operating in an RRC inactive state, the method comprising configuring a notification area of the radio access network part by determining one or more of the base stations and/or one or more of the non-terrestrial network parts which form part of the notification area, the base stations and/or the non-terrestrial network parts of the notification area being for use in transmitting signals to the communications device from the wireless communications network, determining, based on the notification area and on a present time, which one of the base stations and/or the non-terrestrial network parts of the notification area is presently serving the communications device, and transmitting a paging message to the serving base station or serving non terrestrial network part for subsequent transmission to the communications device.

Paragraph 2. A method according to Paragraph 1, wherein the base stations and/or the non-terrestrial network parts of the notification area are determined by the infrastructure equipment based on one or more of a pre-planned journey to be made by the communications device, location information received from the communications device indicating a geographical area in which the communications device is located, and ephemeris information of the non-terrestrial network parts and/or the communications device.

Paragraph 3. A method according to Paragraph 1 or Paragraph 2, wherein the paging message indicates that there is downlink data to be transmitted to the communications device.

Paragraph 4. A method according to any of Paragraphs 1 to 3, wherein the infrastructure equipment is one of the base stations and/or the non-terrestrial network parts of the notification area which was most recently serving the communications device before the serving base station or serving non-terrestrial network part.

Paragraph 5. A method according to any of Paragraphs 1 to 4, comprising transmitting an indication of the notification area to each of the base stations and/or the non-terrestrial network parts of the notification area.

Paragraph 6. A method according to Paragraph 5, comprising controlling each of the base stations and/or the non-terrestrial network parts of the notification area, when acting as the serving base station or serving non terrestrial network part, to transmit context information associated with the communications device to a next one of the base stations and/or the non-terrestrial network parts of the notification area which will be serving the communications device subsequently to the serving base station or serving non terrestrial network part.

Paragraph 7. A method according to any of Paragraphs 1 to 6, wherein the communications device is a non-terrestrial communications device.

Paragraph 8. A method according to any of Paragraphs 1 to 7, wherein the communications device is a ground-based communications device.

Paragraph 9. A method according to any of Paragraphs 1 to 8, comprising receiving, from the communications device, location information indicating a geographic area in which the communications device is located and a notification area update indicating that the communications device has moved outside the coverage of the base stations and/or the non-terrestrial network parts of the notification area.

Paragraph 10. A method according to Paragraph 9, comprising
disabling a periodic notification area update timer for the communications device, the periodic notification area update timer being for use by the communications device to change between the base stations and/or the non-terrestrial network parts of the notification area as a serving base station or serving non terrestrial part depending on the position of the communications device in the notification area.

Paragraph 11. A method according to any of Paragraphs 1 to 10, comprising
transmitting an indication of the notification area to the communications device.

Paragraph 12. A method according to any of Paragraphs 1 to 11, wherein the coverage region formed by at least one of the spot beams varies over time in accordance with a motion of the non-terrestrial network part transmitting the at least one spot beam with respect to the surface of the Earth.

Paragraph 13. A method according to any of Paragraphs 1 to 12, wherein
a trajectory of at least one of the non-terrestrial network parts is such that the coverage region formed by each of the spot beams transmitted by the at least one non-terrestrial network part is substantially constant over a time period.

Paragraph 14. A method according to any of Paragraphs 1 to 13, wherein the non-terrestrial network parts each comprise one of a satellite, an airborne vehicle or an airborne platform.

Paragraph 15. A method according to any of Paragraphs 1 to 14, wherein each of the spot beams is a different one of a set of Transmission Configuration Indication, TCI, states.

Paragraph 16. An infrastructure equipment forming part of a radio access network part of a wireless communications network, the radio access network part comprising one or more base stations and one or more non-terrestrial network parts, the non-terrestrial network parts each transmitting one or more spot beams to provide a first type of wireless access interface and the base stations each forming a second type of wireless access interface, the first type of wireless access interface and the second type of wireless access interface each being for transmitting signals to and receiving signals representing data from a communications device within a coverage region of a cell of one of the base stations or a coverage region formed by one of the spot beams, wherein the communications device is operating in an RRC inactive state, the infrastructure equipment comprising controller circuitry and transceiver circuitry which are configured in combination
to configure a notification area of the radio access network part by determining one or more of the base stations and/or one or more of the non-terrestrial network parts which form part of the notification area, the base stations and/or the non-terrestrial network parts of the notification area being for use in transmitting signals to the communications device from the wireless communications network,
to determine, based on the notification area and on a present time, which one of the base stations and/or the non-terrestrial network parts of the notification area is presently serving the communications device, and
to transmit a paging message to the serving base station or serving non terrestrial network part for subsequent transmission to the communications device.

Paragraph 17. Circuitry for an infrastructure equipment forming part of a radio access network part of a wireless communications network, the radio access network part comprising one or more base stations and one or more non-terrestrial network parts, the non-terrestrial network parts each transmitting one or more spot beams to provide a first type of wireless access interface and the base stations each forming a second type of wireless access interface, the first type of wireless access interface and the second type of wireless access interface each being for transmitting signals to and receiving signals representing data from a communications device within a coverage region of a cell of one of the base stations or a coverage region formed by one of the spot beams, wherein the communications device is operating in an RRC inactive state, the infrastructure equipment comprising controller circuitry and transceiver circuitry which are configured in combination
to configure a notification area of the radio access network part by determining one or more of the base stations and/or one or more of the non-terrestrial network parts which form part of the notification area, the base stations and/or the non-terrestrial network parts of the notification area being for use in transmitting signals to the communications device from the wireless communications network,
to determine, based on the notification area and on a present time, which one of the base stations and/or the non-terrestrial network parts of the notification area is presently serving the communications device, and
to transmit a paging message to the serving base station or serving non terrestrial network part for subsequent transmission to the communications device.

Paragraph 18. A method for operating an infrastructure equipment forming part of a radio access network part of a wireless communications network, the radio access network part comprising one or more base stations and one or more non-terrestrial network parts, the non-terrestrial network parts each transmitting one or more spot beams to provide a first type of wireless access interface and the base stations each forming a second type of wireless access interface, the first type of wireless access interface and the second type of wireless access interface each being for transmitting signals to and receiving signals representing data from a communications device within a coverage region of a cell of one of the base stations or a coverage region formed by one of the spot beams, wherein the communications device is operating in an RRC inactive state, the method comprising
receiving, from a second infrastructure equipment of the radio access network part, an indication of a notification area of the radio access network part comprising the infrastructure equipment, the notification area further comprising one or more of the base stations and/or one or more of the non-terrestrial network parts, the base stations and/or the non-terrestrial network parts of the notification area being for use in transmitting signals to the communications device from the wireless communications network,
determining, based on the notification area and on a present time, that the infrastructure equipment is presently serving the communications device,
receiving a paging message from the second infrastructure equipment, and
transmitting the paging message to the communications device.

Paragraph 19. A method according to Paragraph 18, wherein the notification area comprises base stations and/or non-terrestrial network parts based on one or more of a pre-planned journey to be made by the communications device, location information received from the communications device indicating a geographical area in which the communications device is located, and ephemeris information of the non-terrestrial network parts and/or the communications device.

Paragraph 20. A method according to Paragraph 18 or Paragraph 19, wherein the paging message indicates that there is downlink data to be transmitted to the communications device.

Paragraph 21. A method according to Paragraph 20, comprising
receiving the downlink data from a core network part of the wireless communications network, and
transmitting the received downlink data to the communications device.

Paragraph 22. A method according to any of Paragraphs 18 to 21, comprising
receiving a command from the second infrastructure equipment, when the infrastructure equipment is serving the communications device, to transmit context information associated with the communications device to a next one of the base stations and/or the non-terrestrial network parts of the notification area which will be serving the communications device subsequently to the infrastructure equipment, and
transmitting the context information to the next one of the base stations and/or the non-terrestrial network parts of the notification area which will be serving the communications device subsequently to the infrastructure equipment.

Paragraph 23. A method according to any of Paragraphs 18 to 22, wherein the communications device is a non-terrestrial communications device.

Paragraph 24. A method according to any of Paragraphs 18 to 23, wherein the communications device is a ground-based communications device.

Paragraph 25. A method according to any of Paragraphs 18 to 24, wherein the infrastructure equipment is one of the base stations.

Paragraph 26. A method according to any of Paragraphs 18 to 25, wherein the infrastructure equipment is one of the non-terrestrial network parts.

Paragraph 27. A method according to any of Paragraphs 18 to 26, wherein the second infrastructure equipment is one of the base stations and/or the non-terrestrial network parts of the notification area which was most recently serving the communications device before the infrastructure equipment.

Paragraph 28. An infrastructure equipment forming part of a radio access network part of a wireless communications network, the radio access network part comprising one or more base stations and one or more non-terrestrial network parts, the non-terrestrial network parts each transmitting one or more spot beams to provide a first type of wireless access interface and the base stations each forming a second type of wireless access interface, the first type of wireless access interface and the second type of wireless access interface each being for transmitting signals to and receiving signals representing data from a communications device within a coverage region of a cell of one of the base stations or a coverage region formed by one of the spot beams, wherein the communications device is operating in an RRC inactive state, the infrastructure equipment comprising controller circuitry and transceiver circuitry which are configured in combination
to receive, from a second infrastructure equipment of the radio access network part, an indication of a notification area of the radio access network part comprising the infrastructure equipment, the notification area further comprising one or more of the base stations and/or one or more of the non-terrestrial network parts, the base stations and/or the non-terrestrial network parts of the notification area being for use in transmitting signals to the communications device from the wireless communications network,
to determine, based on the notification area and on a present time, that the infrastructure equipment is presently serving the communications device,
to receive a paging message from the second infrastructure equipment, and
to transmit the paging message to the communications device.

Paragraph 29. Circuitry for an infrastructure equipment forming part of a radio access network part of a wireless communications network, the radio access network part comprising one or more base stations and one or more non-terrestrial network parts, the non-terrestrial network parts each transmitting one or more spot beams to provide a first type of wireless access interface and the base stations each forming a second type of wireless access interface, the first type of wireless access interface and the second type of wireless access interface each being for transmitting signals to and receiving signals representing data from a communications device within a coverage region of a cell of one of the base stations or a coverage region formed by one of the spot beams, wherein the communications device is operating in an RRC inactive state, the infrastructure equipment comprising controller circuitry and transceiver circuitry which are configured in combination
to receive, from a second infrastructure equipment of the radio access network part, an indication of a notification area of the radio access network part comprising the infrastructure equipment, the notification area further comprising one or more of the base stations and/or one or more of the non-terrestrial network parts, the base stations and/or the non-terrestrial network parts of the notification area being for use in transmitting signals to the communications device from the wireless communications network,
to determine, based on the notification area and on a present time, that the infrastructure equipment is presently serving the communications device,
to receive a paging message from the second infrastructure equipment, and
to transmit the paging message to the communications device.

Paragraph 30. A method for operating a communications device in a wireless communications network, the wireless communications network comprising a core network part and a radio access network part comprising one or more base stations and one or more non-terrestrial network parts, the non-terrestrial network parts each transmitting one or more spot beams to provide a first type of wireless access interface and the base stations each forming a second type of wireless access interface, the first type of wireless access interface and the second type of wireless access interface each being for transmitting signals to and receiving signals representing data from a communications device within a coverage region of a cell of one of the base stations or a coverage region formed by one of the spot beams, wherein the communications device is operating in an RRC inactive state, the method comprising
receiving, from a serving one of the base stations or non-terrestrial network parts, an indication of a notification area comprising the serving base station or serving non-terrestrial network part, the notification area further comprising one or more of the base stations and/or one or more of the non-terrestrial network parts, the base stations and/or the non-terrestrial network parts of the notification area being for use in transmitting signals to the communications device from the wireless communications network, and transmitting, either to one of the base stations and/or the non-terrestrial network parts of the radio access network part or to the core network via one of the base stations and/or the non-terrestrial network parts of the radio access network part, location information indicating a geographic area in which the communications device is located and a notification area update indicating that the communications device has moved outside the coverage of the base stations and/or the non-terrestrial network parts of the notification area.

Paragraph 31. A method according to Paragraph 30, comprising receiving a paging message from the serving base station or serving non-terrestrial network part, the paging message indicates that there is downlink data to be transmitted to the communications device.

Paragraph 32. A method according to Paragraph 31, comprising transitioning from the RRC inactive state to an RRC connected state in order to receive the downlink data, and receiving the downlink data from the core network part via the serving base station or serving non terrestrial network.

Paragraph 33. A method according to any of Paragraphs 30 to 32, wherein the communications device is a non-terrestrial communications device.

Paragraph 34. A method according to any of Paragraphs 30 to 33, wherein the communications device is a ground-based communications device.

Paragraph 35. A method according to any of Paragraphs 30 to 34, comprising disabling a periodic notification area update timer, the periodic notification area update timer being for use by the communications device to change between the base stations and/or the non-terrestrial network parts of the notification area as a serving base station or serving non terrestrial part depending on the position of the communications device in the notification area.

Paragraph 36. A communications device operating in a wireless communications network, the wireless communications network comprising a core network part and a radio access network part comprising one or more base stations and one or more non-terrestrial network parts, the non-terrestrial network parts each transmitting one or more spot beams to provide a first type of wireless access interface and the base stations each forming a second type of wireless access interface, the first type of wireless access interface and the second type of wireless access interface each being for transmitting signals to and receiving signals representing data from a communications device within a coverage region of a cell of one of the base stations or a coverage region formed by one of the spot beams, wherein the communications device is operating in an RRC inactive state, the communications device comprising controller circuitry and transceiver circuitry which are configured in combination to receive, from a serving one of the base stations or non-terrestrial network parts, an indication of a notification area comprising the serving base station or serving non-terrestrial network part, the notification area further comprising one or more of the base stations and/or one or more of the non-terrestrial network parts, the base stations and/or the non-terrestrial network parts of the notification area being for use in transmitting signals to the communications device from the wireless communications network, and to transmit, either to one of the base stations and/or the non-terrestrial network parts of the radio access network part or to the core network via one of the base stations and/or the non-terrestrial network parts of the radio access network part, location information indicating a geographic area in which the communications device is located and a notification area update indicating that the communications device has moved outside the coverage of the base stations and/or the non-terrestrial network parts of the notification area.

Paragraph 37. A communications device operating in a wireless communications network, the wireless communications network comprising a core network part and a radio access network part comprising one or more base stations and one or more non-terrestrial network parts, the non-terrestrial network parts each transmitting one or more spot beams to provide a first type of wireless access interface and the base stations each forming a second type of wireless access interface, the first type of wireless access interface and the second type of wireless access interface each being for transmitting signals to and receiving signals representing data from a communications device within a coverage region of a cell of one of the base stations or a coverage region formed by one of the spot beams, wherein the communications device is operating in an RRC inactive state, the communications device comprising controller circuitry and transceiver circuitry which are configured in combination to receive, from a serving one of the base stations or non-terrestrial network parts, an indication of a notification area comprising the serving base station or serving non-terrestrial network part, the notification area further comprising one or more of the base stations and/or one or more of the non-terrestrial network parts, the base stations and/or the non-terrestrial network parts of the notification area being for use in transmitting signals to the communications device from the wireless communications network, and to transmit, either to one of the base stations and/or the non-terrestrial network parts of the radio access network part or to the core network via one of the base stations and/or the non-terrestrial network parts of the radio access network part, location information indicating a geographic area in which the communications device is located and a notification area update indicating that the communications device has moved outside the coverage of the base stations and/or the non-terrestrial network parts of the notification area.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] TR 38.811, "Study on New Radio (NR) to support non terrestrial networks (Release 15)", 3rd Generation Partnership Project, December 2017.
[2] Holma H. and Toskala A, "LTE for UMTS OFDMA and SC-FDMA based radio access", John Wiley and Sons, 2009.
[3] RP-172834, "Revised WID on New Radio Access Technology," NTT DOCOMO, RAN #78.
[4] TR 38.913, "Study on Scenarios and Requirements for Next Generation Access Technologies (Release 14)", 3rd Generation Partnership Project.
[5] TS 38.300, "NR and NG-RAN Overall Description; Stage 2 (Release 15)", 3rd Generation Partnership Project.

What is claimed is:

1. A method for operating an infrastructure equipment forming part of a radio access network part of a wireless communications network, the method comprising:
configuring a notification area of the radio access network part, the radio access network part comprising one or more base stations and one or more non-terrestrial network parts, the non-terrestrial network parts each transmitting one or more spot beams to provide a first type of wireless access interface and the base stations each forming a second type of wireless access interface, the first type of wireless access interface and the second type of wireless access interface each being for transmitting signals to and receiving signals representing data from a communications device within a coverage region of a cell of one of the base stations or a coverage region formed by one of the spot beams, wherein the communications device is operating in an RRC inactive state;
wherein configuring the notification area of the radio access network part includes determining one or more of the non-terrestrial network parts which form part of the notification area, the non-terrestrial network parts of the notification area being for use in transmitting signals to the communications device from the wireless communications network, wherein the non-terrestrial network parts of the notification area are determined by the infrastructure equipment based on one or more of a pre-planned journey to be made by the communications device, location information received from the communications device indicating a geographical area in which the communications device is located, and ephemeris information of the non-terrestrial network parts and/or the communications device;
determining, based on the notification area and on a present time, which one of the non-terrestrial network parts of the notification area is presently serving the communications device; and
transmitting a paging message to the serving non terrestrial network part for subsequent transmission to the communications device,
wherein the communications device is a non-terrestrial communications device,
wherein each of the non-terrestrial network parts is one of a satellite, an airborne vehicle or an airborne platform, and
wherein each of the spot beams is a different one of a set of Transmission Configuration Indication, TCI, states.

2. The method according to claim 1, wherein the paging message indicates that there is downlink data to be transmitted to the communications device.

3. The method according to claim 1, wherein the infrastructure equipment is one of the base stations and/or the non-terrestrial network parts of the notification area which was most recently serving the communications device before the serving base station or serving non-terrestrial network part.

4. The method according to claim 1, comprising
transmitting an indication of the notification area to each of the base stations and/or the non-terrestrial network parts of the notification area.

5. The method according to claim 4, comprising
controlling each of the base stations and/or the non-terrestrial network parts of the notification area, when acting as the serving base station or serving non terrestrial network part, to transmit context information associated with the communications device to a next one of the base stations and/or the non-terrestrial network parts of the notification area which will be serving the communications device subsequently to the serving base station or serving non terrestrial network part.

6. The method according to claim 1, wherein the communications device is a ground-based communications device.

7. The method according to claim 1, comprising
receiving, from the communications device, location information indicating a geographic area in which the communications device is located and a notification area update indicating that the communications device has moved outside the coverage of the base stations and/or the non-terrestrial network parts of the notification area.

8. The method according to claim 7, comprising
disabling a periodic notification area update timer for the communications device, the periodic notification area update timer being for use by the communications device to change between the base stations and/or the non-terrestrial network parts of the notification area as a serving base station or serving non terrestrial part depending on the position of the communications device in the notification area.

9. The method according to claim 1, comprising
transmitting an indication of the notification area to the communications device.

10. The method according to claim 1, wherein the coverage region formed by at least one of the spot beams varies over time in accordance with a motion of the non-terrestrial network part transmitting the at least one spot beam with respect to the surface of the Earth.

11. The method according to claim 1, wherein
a trajectory of at least one of the non-terrestrial network parts is such that the coverage region formed by each of the spot beams transmitted by the at least one non-terrestrial network part is substantially constant over a time period.

12. An infrastructure equipment forming part of a radio access network part of a wireless communications network, the infrastructure equipment comprising controller circuitry and transceiver circuitry which are configured in combination to:
configure a notification area of the radio access network part, the radio access network part comprising one or more base stations and one or more non-terrestrial network parts, the non-terrestrial network parts each transmitting one or more spot beams to provide a first type of wireless access interface and the base stations each forming a second type of wireless access interface, the first type of wireless access interface and the second type of wireless access interface each being for transmitting signals to and receiving signals representing data from a communications device within a coverage region of a cell of one of the base stations or a coverage region formed by one of the spot beams, wherein the communications device is operating in an RRC inactive state,
wherein the controller and transceiver circuitry for configuring the notification area of the radio access network part are further configured to determine one or more of the and/or one or more of the non-terrestrial network parts which form part of the notification area, the non-terrestrial network parts of the notification area being for use in transmitting signals to the communications device from the wireless communications network, wherein the non-terrestrial network parts of the notification area are determined by the infrastructure equipment based on one or more of a pre-planned journey to be made by the communications device, location information received from the communications device indicating a geographical area in which the communications device is located, and ephemeris information of the non-terrestrial network parts and/or the communications device,
determine, based on the notification area and on a present time, which one of the non-terrestrial network parts of the notification area is presently serving the communications device, and
transmit a paging message to the serving non terrestrial network part for subsequent transmission to the communications device,
wherein the communications device is a non-terrestrial communications device,
wherein each of the non-terrestrial network parts is one of a satellite, an airborne vehicle or an airborne platform, and
wherein each of the spot beams is a different one of a set of Transmission Configuration Indication, TCI, states.

13. A method for operating a communications device in a wireless communications network, the wireless communications network comprising a core network part and a radio access network part comprising one or more non-terrestrial network parts, the method comprising
receiving, from a serving one of the non-terrestrial network parts, an indication of a notification area comprising the serving non-terrestrial network part, the notification area further comprising one or more of the non-terrestrial network parts, the non-terrestrial network parts of the notification area being for use in transmitting signals to the communications device from the wireless communications network,
wherein the non-terrestrial network parts each transmitting one or more spot beams to provide a first type of wireless access interface and the base stations each forming a second type of wireless access interface, the first type of wireless access interface and the second type of wireless access interface each being for transmitting signals to and receiving signals representing data from a communications device within a coverage region of a cell of one of the base stations or a coverage region formed by one of the spot beams, wherein the communications device is operating in an RRC inactive state,
transmitting, to one of the non-terrestrial network parts of the radio access network part or to the core network via one of the non-terrestrial network parts of the radio access network part, location information indicating a geographic area in which the communications device is located and a notification area update indicating that the communications device has moved outside the coverage of the non-terrestrial network parts of the notification area; and
disabling a periodic notification area update timer, the periodic notification area update timer being for use by the communications device to change between the non-terrestrial network parts of the notification area as a serving non terrestrial part depending on the position of the communications device in the notification area,
wherein the communications device is a non-terrestrial communications device,
wherein each of the non-terrestrial network parts is one of a satellite, an airborne vehicle or an airborne platform, and
wherein each of the spot beams is a different one of a set of Transmission Configuration Indication, TCI, states.

14. The method according to claim 13, comprising
receiving a paging message from the serving non-terrestrial network part, the paging message indicates that there is downlink data to be transmitted to the communications device.

15. The method according to claim 14, comprising
transitioning from the RRC inactive state to an RRC connected state in order to receive the downlink data, and
receiving the downlink data from the core network part via the serving base station or serving non terrestrial network.

* * * * *